(12) United States Patent
Simpson (10) Patent No.: US 12,176,999 B2
(45) Date of Patent: Dec. 24, 2024

(54) SYSTEM AND METHOD OF VERIFYING DISPLAY OF VISUAL INFORMATION

(71) Applicant: Vojo IP Limited, Lisburn (GB)

(72) Inventor: Terence Andrew Simpson, Ballynahinch (GB)

(73) Assignee: Vojo IP Limited, Lisburn (GB)

( * ) Notice: Subject to any disclaimer, the term of this patent is extended or adjusted under 35 U.S.C. 154(b) by 128 days.

(21) Appl. No.: 17/605,826

(22) PCT Filed: Apr. 27, 2020

(86) PCT No.: PCT/EP2020/061654
§ 371 (c)(1),
(2) Date: Oct. 22, 2021

(87) PCT Pub. No.: WO2020/216964
PCT Pub. Date: Oct. 29, 2020

(65) Prior Publication Data
US 2022/0209877 A1    Jun. 30, 2022

(30) Foreign Application Priority Data
Apr. 25, 2019 (GB) .................................... 1905797

(51) Int. Cl.
*H04N 21/24* (2011.01)
*H04H 20/14* (2008.01)
(Continued)

(52) U.S. Cl.
CPC .......... *H04H 20/14* (2013.01); *H04H 60/31* (2013.01); *H04H 60/48* (2013.01);
(Continued)

(58) Field of Classification Search
CPC .................................................. H04N 21/2407
See application file for complete search history.

(56) References Cited

U.S. PATENT DOCUMENTS

2002/0190972 A1    12/2002    Ven de Van
2003/0080434 A1    5/2003    Wataya
(Continued)

FOREIGN PATENT DOCUMENTS

CN    204316628 U    5/2015
EP    2336966 A1    6/2011
(Continued)

OTHER PUBLICATIONS

International Search Report and Written Opinion from related PCT Application No. PCT/EP2020/061654 mailed Jun. 16, 2020.
(Continued)

*Primary Examiner* — Michael H Hong
(74) *Attorney, Agent, or Firm* — Barclay Damon LLP (57) ABSTRACT

A method of verifying display of primary visual information on a screen of an electronic visual display device in which primary visual information is displayed on the screen of the display device. Visual verification information is simultaneously displayed at a verification location of the screen. The verification location is monitored using an optical detector to determine if the visual verification information is displayed. Display of the primary visual information is verified if it is determined that the verification information has been displayed.

9 Claims, 3 Drawing Sheets

(51) Int. Cl.
  *H04H 60/31* (2008.01)
  *H04H 60/48* (2008.01)
  *H04N 21/431* (2011.01)
  *H04N 21/81* (2011.01)

(52) U.S. Cl.
  CPC ..... *H04N 21/2407* (2013.01); *H04N 21/4316* (2013.01); *H04N 21/812* (2013.01)

(56) References Cited

U.S. PATENT DOCUMENTS

| | | | |
|---|---|---|---|
| 2003/0115591 A1 | 6/2003 | Weissmueller et al. | |
| 2006/0151847 A1 | 7/2006 | Kwon et al. | |
| 2009/0082649 A1* | 3/2009 | Muller | A61M 1/3656 600/310 |
| 2010/0157152 A1 | 6/2010 | Weitbruch et al. | |
| 2012/0023516 A1* | 1/2012 | Wolinsky | H04N 21/44222 725/12 |
| 2014/0049671 A1 | 2/2014 | Chen | |
| 2016/0104738 A1 | 4/2016 | Luan | |
| 2018/0075264 A1 | 3/2018 | Moriki et al. | |
| 2019/0075370 A1* | 3/2019 | Kim | H04N 21/6582 |

FOREIGN PATENT DOCUMENTS

| | | |
|---|---|---|
| GB | 2429357 A | 2/2007 |
| WO | 2010093699 A1 | 8/2010 |
| WO | 2015071051 A1 | 5/2015 |
| WO | 2016152502 A1 | 12/2017 |
| WO | 2019045543 A1 | 3/2019 |

OTHER PUBLICATIONS

Examination/Search Report from related GB Application No. GB1905797.5 dated Oct. 9, 2019.

Examination Report issued in GB Application No. 2117051.9 on Mar. 29, 2023.

* cited by examiner

SYSTEM AND METHOD OF VERIFYING DISPLAY OF VISUAL INFORMATION

CROSS REFERENCE TO RELATED APPLICATIONS

This is a National Stage Application filed under 35 U.S.C. 371 based on International Patent Application No. PCT/EP2020/061654, filed on Apr. 27, 2020, which claims priority to Great Britain Patent Application No. 1905797.5, filed on Apr. 25, 2019, the disclosures of both of which are incorporated herein by reference in their entireties.

FIELD OF THE INVENTION

This invention relates to the display of visual information on an electronic visual display device.

BACKGROUND TO THE INVENTION

In the field of advertising and promotion it is well known for organisations to create promotional videos or the like for display on electronic visual display devices. These videos may be displayed at a large number of locations and it can be difficult for the organisations, or for a service provider whose responsibility it is to organise the display of the videos, to verify that all of the scheduled plays of the video have been made. One problem in this regard is that, even if the video file is sent to the display device, the display device may have its screen switch off, or may be tuned to the wrong channel or switched to the wrong input, in which case the video is not actually displayed.

It would be desirable to mitigate the problems outlined above.

SUMMARY OF THE INVENTION

From a first aspect the invention provides a method of verifying display of visual information on a screen of an electronic visual display device, the method comprising: sending at least one input signal to said electronic visual display device, said at least one input signal comprising data for causing said electronic visual display device to display said visual information on said screen, said at least one input signal further including data for causing said electronic visual display device to display verification information on said screen simultaneously with said visual information; and monitoring said screen using at least one optoelectronic sensor to detect display of said verification information on said screen. Display of said visual information may be verified in response to detection of the display of said verification information.

Preferably, the method includes displaying said visual verification information at at least one verification location on a display area of said screen, and monitoring said at least one location using said at least one optical detector. Said at least one verification location is preferably located at a peripheral part of said display area, preferably at a corner or side of said display area. Said at least one verification location preferably occupies a portion of said display area, preferably less than 5% of said display area.

Typically, said at least one input signal comprises data representing said primary visual information, and wherein said primary visual information may comprise any one or more of: text; one or more image; one or more animation; one or more video.

Typically, said at least one input comprises data representing said visual verification information, and wherein said visual verification information may comprise any visual information that may be displayed on the screen and be detectable by said at least one optical detector, preferably a colour and/or a tone, or a sequence of colours and/or tones.

Said data representing said visual verification information may be included in, added to, or associated with, said data representing said primary visual information.

The preferred method includes verifying display of said primary visual information by determining that said visual verification information is detected on said screen by said at least one optical detector.

Typically, said monitoring includes processing an output signal of said at least one optical detector to determine if said output signal includes information representing said visual verification information.

In preferred embodiments, the method includes extracting current visual information from said output signal and comparing in real time the extracted current visual information with the visual verification information intended for current display, and determining if the extracted current visual information matches the intended current visual verification information. Said comparing preferably involves using one or more adjustable similarity threshold.

Preferably, said visual verification information comprises a sequence of multiple parts, said method including sending one part at a time for display on said electronic visual display device, and wherein said comparing in real time the extracted current visual information with the visual verification information intended for current display, and determining if the extracted current visual information matches the intended current visual verification information is performed after one part is sent and before the next part is sent. Preferably, each part comprises data representing a colour, a pattern or a tone.

Advantageously the method includes performing multiple instances of said comparing in real time the extracted current visual information with the visual verification information intended for current display, and said determining if the extracted current visual information matches the intended current visual verification information in succession, and determining from said multiple instances if the extracted current visual information matches the intended visual verification information. Optionally, the method includes determining that the extracted current visual information matches the intended visual verification information if in at least one of said instances there is deemed to be a match. Optionally, the method includes determining that the extracted current visual information matches the intended visual verification information if in at least a threshold number of said instances there is deemed to be a match. Optionally the method includes determining that the extracted current visual information matches the intended visual verification information if in at least a threshold percentage of said instances there is deemed to be a match. The number of instances is preferably adjustable.

The method may include adjusting the position and/or size of said at least one verification location on aid display area of said screen to match the location of said at least one optical detector.

Typically, said primary visual information comprises a visual presentation, and said visual verification information is separate from said visual presentation.

Said at least one input signal may include data for causing said visual verification information to be displayed on said screen as foreground visual information, optionally overlying a portion of said primary visual information.

Said at least one input signal may include data for causing said visual verification information to be displayed on said screen separately from said primary visual information.

Preferably, said at least one verification location occupies a portion of said display area that is smaller than a region of said display area in which said primary visual information is displayed.

From a second aspect the invention provides a system for verifying display of primary visual information on a screen of an electronic visual display device, the system comprising: means for sending at least one input signal to said electronic visual display device, said at least one input signal comprising data for causing said electronic visual display device to display said primary visual information on said screen, said at least one input signal further including data for causing said electronic visual display device to display visual verification information on said screen simultaneously with said primary visual information; and means for monitoring said screen to detect display of said visual verification information on said screen, said monitoring means comprising at least one optical detector.

Preferably, said at least one optical detector comprises one or more photodetector or other optoelectronic device. In preferred embodiments, said at least one optical detector is a colour sensor, a greyscale sensor, or a binary (e.g. black and white) sensor. Alternatively, said at least one optical detector comprises an image sensor or a digital camera.

In preferred embodiments, said monitoring means comprises an optical detection assembly for mounting on said screen, the optical detection assembly comprising a first portion on which said at least one optical detector is provided, and a second portion on which other electrical and/or electronic circuitry is provided, the first and second portions being mechanically and electrically connected by a flexible intermediate portion, said intermediate portion preferably being non-resiliently flexible.

Said intermediate portion preferably comprises a flexible circuit. Said first portion, said second portion and said intermediate portion are preferably provided integrally by a flexible circuit. In preferred embodiments, said optical detection assembly comprises a flexible electronic assembly. Said other circuitry typically comprises any one or more of: wired or wireless communication circuitry, signal processing circuitry and/or optical detection circuitry.

In preferred embodiments, said at least one optical detector is adhered to said screen, preferably to a display area of said screen, by at least one adhesive fixing, e.g. an adhesive patch. Preferably, said first portion of the optical detection assembly is adhered to said screen, preferably to a display area of said screen, by at least one adhesive fixing, e.g. an adhesive patch.

From a third aspect the invention provides an optical detection assembly for mounting on a screen, the optical detection assembly comprising a first portion on which at least one optical detector is provided, and a second portion on which other electrical and/or electronic circuitry is provided, the first and second portions being mechanically and electrically connected by a flexible intermediate portion, said intermediate portion preferably being non-resiliently flexible.

It will be apparent that the system of the second aspect and the optical detection assembly of the third aspect may include, as applicable, means for performing any one or more of the features of the method of the first aspect.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
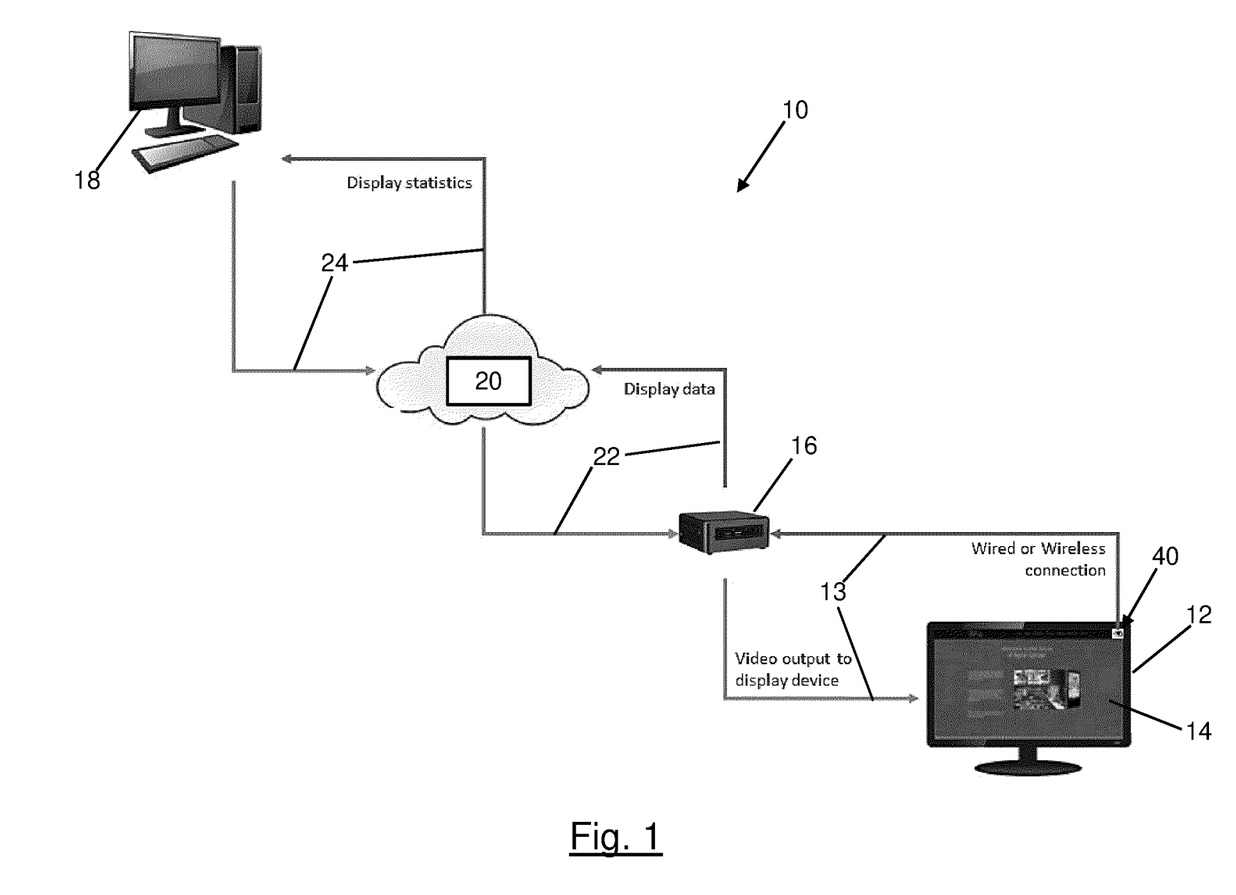
FIG. 1 is a schematic diagram of a system for verifying display of visual information on a screen of an electronic visual display device.

Referring now to the drawings, there is shown, generally indicated as 10, a system for verifying display of visual information on a screen of an electronic visual display device, the system embodying an aspect of the present invention.

The system 10 comprises at least one electronic visual display device 12 having a display screen 14, which may also be referred to as a display or screen. In the illustrated embodiment only one display device 12 is shown, although in typical embodiments the system 10 comprises a plurality of display devices 12. The display device 12 may be of any known type, for example a computer or other computing device, a computer monitor, a display monitor, a television, or a projector system. The display 14 may be of any known type, for example cathode ray tube, LED, OLED, LCD, plasma display panel, or other video display or projector screen.

The system 10 comprises means for sending input signals to the electronic visual display device 12. In preferred embodiments, to this end the system 10 includes at least one media player 16 for playing digital media on the display device 12. The media player 16 may take any known form, comprising software and/or hardware as convenient. For example, the media player 16 may comprise a dedicated electronic device such as a digital medial player, or may comprise media player software running on a computer. The media player 16 may be a stand-alone device (as illustrated) or may be integrated with the display device 12. The media player 16 may be connected to the display device 12 by any conventional means, for example a wired and/or wireless connection 13, which may be direct or across a telecommunications network (which may for example comprise one or more computer network (e.g. a LAN, WAN and/or the internet) and/or a telephone network). In the illustrated embodiment, there is one media player 16 although in alternative embodiments there may be a plurality of media players 16. Each media player 16 may service a respective display device 12 or multiple display devices 12, as desired, and/or each display device 12 may be serviced by more than one media player 16.

The preferred system 10 comprises a central control system 20, conveniently implemented as a server. The control server 20 may comprises one or more computers and may provide server functionality to the media player(s) 16, for example in the form of a hosted cloud server or a dedicated web server. Each media player 16 is in communication with the control server 20 across a telecommunications network (represented by arrows 22), which may for example comprise one or more computer network (e.g. a LAN, WAN and/or the internet) and/or a telephone network.

In preferred embodiments, the system 10 comprises at least one client computing device 18 in communication with the control server 20 across a telecommunications network (represented by arrows 24), which may for example comprise one or more computer network (e.g. a LAN, WAN and/or the internet) and/or a telephone network. The control server 20 may provide server functionality to the client(s) 18, for example in the form of a hosted cloud server or a dedicated web server.

Figure 2:
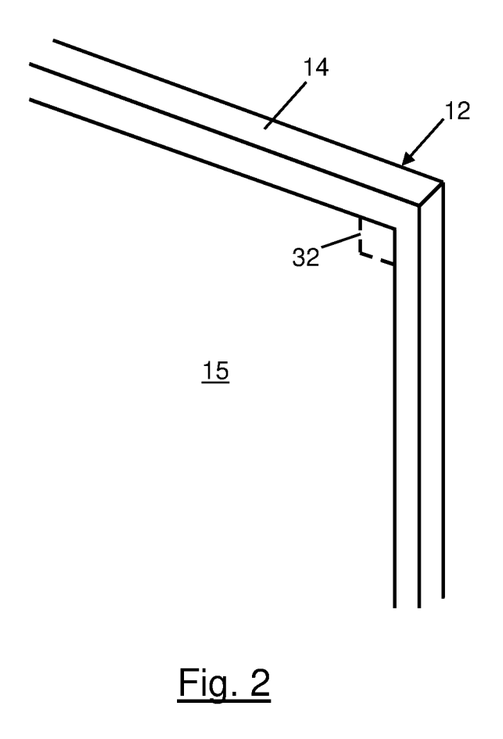
FIG. 2 is a schematic perspective view of part of the screen.
Figure 3:
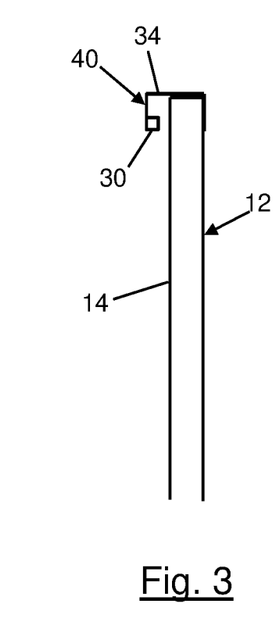
FIG. 3 is an end view of part of the screen.

The system 10 includes means for monitoring the screen 14 to detect display of visual verification information on the screen 14. In preferred embodiments, to this end the system 10 includes at least one optical detector 30 for each screen 14. Each optical detector 30 is mounted on, or otherwise supported with respect to, the display device 12 and is arranged to monitor the screen 14. In particular, each optical detector 30 is positioned to monitor a specific location 32 on the display area 15 of the screen 14, which is referred to hereinafter as the verification location 32. The verification location 32 occupies only a portion of the display area 15 of the screen 14. The size of the verification location may vary depending on the size of the screen and/or the size of the screen pixels. Preferably, the verification location occupies less than 10% of the display area of the screen 14, more preferably less than 5% of the display area, and typically less than 1% of the display area. For example, the verification location may comprise an area corresponding to 1 pixel, or 10 s of pixels or 100 s of pixels, as suits the application. In preferred embodiments, the verification location 32 is located at the periphery of the display area 15, for example at a corner (as illustrated) or along a side of the display area 15. The primary visual information may be displayed using the entire display area 15 or any other desired region of the display area 15. The, or each, verification location 32 occupies a portion of the display area 15 that is smaller than is used to display the primary visual information.

In typical embodiments, only one optical detector 30 is provided for each screen 14. However, optionally more than one detector 30 may be provided for each screen 14, in which case they may each monitor a respective separate verification location, or an overlapping verification location, or the same verification location as desired.

The optical detector 30 may be mounted on the screen 14, or elsewhere on the display device 12, by any convenient means. In the illustrated embodiment, the optical detector 30 is mounted on the display device 12 by a support structure such as a bracket 34. The optical detector 30 and support structure 34 comprise part of an embodiment of an optical detection assembly 40 for mounting on the screen 14, or more generally on the display device 12. The optical detection assembly 40 may additionally include electrical and/or electronic circuitry, as required, for supporting the operation of the optical detector 30 and/or communicating output signals from the detector 30 to the media player 16, e.g. by wired or wireless connection. For example, the circuitry may comprise an RF transmitter and/or signal processing circuitry for processing the output of the optical detector as required, and/or any other conventional optical detection circuitry that may be required. Alternatively, the optical detector 30 may be mounted on any other convenient support structure (for example a wall or ceiling).

In preferred embodiments, the optical detector 30 is mounted directly on the screen 14, preferably on the display area 15 of the screen, so that its detection zone covers the verification location 32. To this end, the optical detector 30 may be mounted on the screen 14 by one or more adhesive fixing. For example, the optical detector 30 may be incorporated into, or placed under, a patch that is fixed to the display area 15 by one or more adhesive fixing. The optical detector 30 may comprise an electronic optical detection circuit provided on a flexible substrate. In any event, the detector 30 is positioned so that it is able to monitor the verification location 32. Typically this involves positioning the detector 30 such that its detection zone coincides with the verification location 32. It will be understood that exact coincidence of the detection zone and verification location is not essential.

Figure 4A:
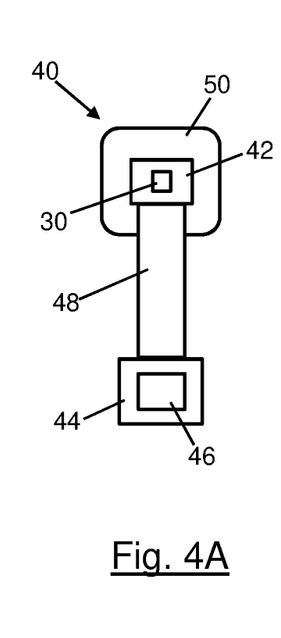
FIG. 4A is a plan view of an optical detection assembly embodying an aspect of the invention.
Figure 4B:
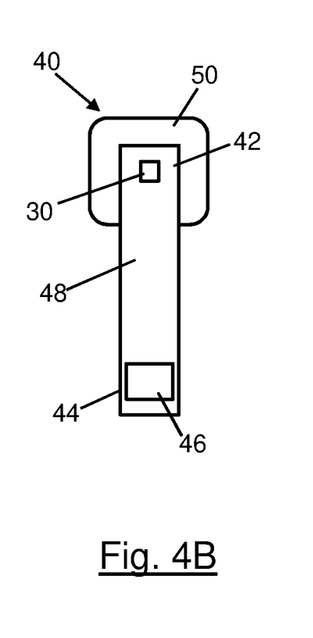
FIG. 4B is a plan view of an alternative embodiment of the optical detection assembly.

FIGS. 4A and 4B show respective embodiments of the optical detection assembly 40 comprising a first portion 42 on which the optical detector 30 is provided and a second portion 44 on which at least some and optionally all of the other electrical and/or electronic circuitry 46 of the assembly 40 is provided. The first and second portions 42, 44 are spaced apart from one another and are joined, mechanically and electrically, by a flexible intermediate portion 48. The length of the intermediate portion 48 is such that the first portion 42 may be mounted on the display area 15 of the screen 14 while the second portion 44 is located off the display area 15, preferably at the rear of the screen 14, or optionally at a side, top or bottom of the screen 14. To this end, the flexibility of the intermediate portion 48 is such that it is able to fold around the screen 14. The intermediate portion 48 is preferably non-resiliently flexible. The intermediate portion 48 includes electrical connections between the first and second portions 42, 44 as required, in particular between the detector 30 and the circuitry 46. In some embodiments, the optical detector 30 may be the only electrical/electronic component on the first portion 42, although it will be understood that one or more other electrical/electronic components may be provided on the first portion 42 in addition to the optical detector 30.

Preferably, an adhesive patch 50, or other adhesive fixing (s) is provided at the first portion 42 for fixing, preferably releasably, the first portion 42 to the display area 15. In preferred embodiments, the first portion 42 is covered by the patch 50 and is located under the patch 50 when adhered to the display surface. Optionally, an adhesive patch, or other adhesive fixing(s) may similarly be provided at the second portion 44 for adhering the second portion 44 to another part, e.g. a rear surface, of the screen 14. Alternatively, no fixing for the second portion 44 may be provided in which case the second portion 44 may hang freely in use. This is convenient in cases where the intermediate portion 48 extends over the top of the screen 14 and the second portion 44 hangs at the rear of the screen 14.

In the embodiment of FIG. 4A, the first portion 42 comprises a rigid circuit substrate, typically a printed circuit board (PCB), on which the optical detector 30 is mounted. The second portion 42 may also comprise a PCB on which the circuitry 46 is provided. The intermediate portion 48 may comprise a flexible cable (e.g. a flat cable) or a flexible circuit. In the embodiment of FIG. 4B the first portion 42, second portion 44 and intermediate portion 48 are provided by a flexible circuit and are preferably integrally formed with each other. Preferably, the first portion 42 is one end of the flexible circuit and the second portion 44 is the other end of the flexible circuit. Any conventional flexible circuit may be used, for example of types commonly known as. flex circuits, flexible printed circuit boards, flex print or flexi-circuits. In preferred embodiments, therefore, the optical detection assembly 40 is a flexible electronic assembly.

The preferred configuration of the optical detection assembly 40 described above is advantageous in that the first portion 42 is relatively unobtrusive when mounted on the display area 15 and the second portion 44 may be out of sight, e.g. behind the screen 14, or at least not obscuring the screen. Moreover, the flexibility and the adhesive fixing(s) each facilitate fast and straightforward installation of the assembly 40 on screens of different sizes and shapes.

The optical detector 30 may take any suitable conventional form. For example, the optical detector 30 may comprise one or more photodetector, photodiode or other optoelectronic device. In preferred embodiments, the optical detector 30 comprises a colour sensor such as an RGB colour sensor or other digital colour sensor. Alternatively, the optical detector 30 may comprise an image sensor or a digital camera. In preferred embodiments however the optical detector 30 is a simple optical detector (e.g. not an image sensor) comprising a small number, e.g. between 1, 2, 3 or 4, of photodetectors or photodiodes. Typically, the or each optoelectronic device is incorporated in a circuit. The circuit may include any other convention components that are required to enable the optical detector 30 to perform the functions described herein.

The media player 16 is configured to provide one or more input signal to the, or each, display device 12 with which it is associated. The input signal carries data representing the primary visual information that it is desired to display on the screen 14. The primary visual information typically comprises any one or more of: text, image(s), animation(s), video(s) and/or any visual digital medium or visual digital media as desired, and may be provided in any suitable digital data format or digital media format as required. Audio data may also be included if desired. Typically, the primary visual information comprises an advertisement, promotional video or other single-medium or multimedia visual still or sequence. More generally, the primary visual information comprises a visual presentation for displaying on one or more display device 12. Usually, the primary visual information is intended for display using the entire of the display area 15.

The input signal(s) also carries data representing visual verification information for displaying on the screen 14 simultaneously with the primary visual information. In preferred embodiments, the visual verification information is displayed at the verification location 32. In embodiments where there is more than one verification location on the screen 14, respective verification information may be provided for display at each respective verification location.

The visual verification information may take any desired form. For example, the visual verification information may comprise a colour and/or tone (e.g. binary (black and white), grayscale or RGB), a sequence of colours and/or tones (e.g. binary (black and white), grayscale or RGB), a code (e.g. an alphanumeric code), an image or sequence of images, a character or sequence or characters, a pattern or a sequence of patterns, a symbol or a sequence of symbols. More generally, the visual verification information may comprise any visual information that may be displayed on the screen 14 and which can be detected by the optical detector 30. Advantageously the visual verification information is of a type that can be detected by a simple optical detector such as a colour sensor, a greyscale sensor, or a binary (e.g. black and white) sensor. For example, in the case where the optical detector 30 comprises an RGB colour sensor, the visual verification information may comprise an RGB colour, or sequence of RGB colours and/or colour tones. Alternatively, in cases where the optical detector 30 comprises a digital camera, the visual verification information may comprise an image or sequence of images. Typically, the visual verification information is displayed using the, or each, pixel that is allocated to the verification location 32.

The visual verification information may be provided in any suitable digital data format or digital media format as required. The visual verification information may be rendered on the screen 14 in any convenient manner, e.g. as a video or one or more still images. The visual verification information may be incorporated into the primary visual information or provided separately, as is convenient. In any event, the configuration is such that the visual verification information is visible on the screen 14 while the primary visual information is playing. This typically involves overlaying the visual verification information over the primary visual information or otherwise displaying the visual verification information as foreground visual information, but it may alternatively be achieved by rendering the visual verification information and primary visual information at separate locations on the display area 15. In typical embodiments, the primary visual information comprises a visual presentation, and the visual verification information is separate from the visual presentation, i.e. not part of the original visual presentation in the sense that it is added or otherwise provided by the system 10 for the purpose of display verification. As such, unlike the visual presentation, the visual verification information does not comprise visual information that is intended to be viewed by an audience.

The visual verification information may have an associated run time that determines how long it is displayed. The run time may be the same as or less than the run time of the primary visual information. For example, the visual verification information may be displayed on the screen 14 for the whole duration of the primary visual information, or for part of the duration, e.g. during one or more periods during the display of the primary visual information.

In the illustrated embodiment, a user (not shown) may create all or part of the primary visual information using the client device 18, for example using suitable digital media software supported by the client device 18 and/or using digital media software service(s) provided by the server 20. The resulting primary visual information data is available to the control server 20 (the control server 20 may create the primary visual information data or receive all or part of it from the client device 18 depending on the embodiment). The control server 20 may add, or otherwise associate, visual verification information data with the primary visual information data. The control server 20 sends the primary visual information data (and the respective visual verification data if applicable) to the, or each, media player 16 associated with a display device 12 on which the visual information is to be rendered. In preferred embodiments, however, the media player 16 adds, or otherwise associates, the visual verification information data to the primary visual information data.

The media player 16 sends the primary visual information data and the respective visual verification data to the, or each, relevant display device 12 for simultaneous rendering on the screen 14. The visual verification information may be standardised and used with multiple instances of primary visual information data, or may be unique to each instance of primary visual information data. In either case, the visual verification information may be pre-determined or generated by the control server 20 or by the media player 16 in any convenient manner. Preferably, the media player 16 generates the visual verification information, preferably pseudo-randomly, typically on the fly. In preferred embodiments, the media player 16 is configured to prepare a visual presentation for rendering on the, or each, screen 14 using the primary visual information data received, typically, from the server 20, and to include the visual verification information in the presentation. The media player 16 may receive the visual verification information from the server 20, or may provide it itself. For example the media player 16 may include or have access to a database of visual verification information data, and/or may be configured to generate visual verification information data in any convenient manner, e.g. from the database. The visual verification information data may include information that determines where on the screen 14 the visual verification information is to be displayed, or such information may be otherwise included in the input signal sent to the device 12, or made available to the media player 16 in any other convenient manner.

In use of the preferred embodiment, the primary visual information is displayed on the screen 14, and the visual verification information is simultaneously displayed at the verification location. The optical detector 30 monitors the verification location in order to detect the visual verification information. The display of the primary visual information is verified by detecting the display of the corresponding visual verification information.

In some embodiments, the optical detector 30 sends an output signal to the media player 16, the content of the output signal corresponding to whatever is displayed at the verification location 32. To this end, the optical detector 30 may be connected to the media player 16 by any conventional wired or wireless communication link 13, and the optical detector 30 and media player 16 may be equipped accordingly to support the link 13. The media player 16 is configured to receive the detector output signal and to determine from it whether or not the visual verification information was detected by the detector 30. This may be achieved in any convenient manner. For example, the optical detector 30 may send an unprocessed output signal to the media player 16, and the media player is configured (e.g. to support the use of any conventional signal processing techniques) to process the received detector output signal and to determine whether or not the output signal corresponds to the visual verification information. Alternatively, the optical detector 30 may include signal processing means to allow it to determine whether or not it detects the visual verification information. In this case, the output signal of the optical detector 30 may contain an indication of whether or not the visual verification information is detected.

The optical detector 30 may be configured to send its output signal continuously (while switched on). In such cases, the medial player 16 may time stamp any detections of the visual verification information so that these can be correlated with the timing of primary visual information being sent to the display device 12. Alternatively, the operation of the optical detector 30 (in particular the monitoring of the verification location 32 and generation of its output signal) may be synchronised with the sending of the primary visual information data (and visual verification data) to the display device 12. Accordingly the media player 16 can determine in real time if the visual verification information is detected while the respective primary visual information is played. Conveniently, the media player 16 may control the operation of the optical detector 30 as desired, for example by means of communication link 13.

In preferred embodiments, the media player 16 verifies that the primary visual information was displayed on the screen 14 by detecting that the corresponding visual verification information was displayed. Alternatively, this verification may be performed elsewhere, for example by the control server 20, in which case the media player 16 may send the relevant data to the control server 20 to allow it to make this determination. In alternative embodiments, the optical detector 30 may send its output signal elsewhere, for example to the control server 20, rather than to the media player 16, in which case the control server 20 may process the output signal as required.

In the illustrated embodiment, the media player 16 sends information to the control server 20 via communication link 22 indicating whether or not the scheduled playing of each instance of primary visual information has been verified. Alternatively, the media player 16 may send unprocessed detector output data to the control server 20 and the control server 20 may be configured to process the data to determine if each play can be validated. In either case, the control server 20 may provide feedback information to the client 18 relating to the verification of the playing of the relevant scheduled primary visual information.

It will be understood that alternative embodiments of the invention may be implemented in ways other than that illustrated in FIG. 1. For example, the client 18 and/or the cloud based control server 20 may be omitted. Instead a computing device with a media player may perform the tasks attributed above to the client 18 and control server 20, and may send and receive the relevant signals to and from the display device 12 and detector 20 directly or across a communications network as is convenient.

It will be apparent from the foregoing that the playing of the primary visual information is only verified if the primary visual information, together with the corresponding visual verification information, is actually displayed on the screen 14. Hence, if the primary visual information data is sent to the display device 12 but the screen 14 is not switched on, or if it is tuned to another channel, or if the display device 12 is switched to a different input, the playing of the primary visual information is not verified. Optionally, the duration for which the visual verification information is determined and may be used as part of the verification process, i.e. verification of the display of the primary visual information may occur only if it is determined that the duration of the detected visual verification information meets a threshold criterion, e.g. for longer than a threshold time.

Figure 5:
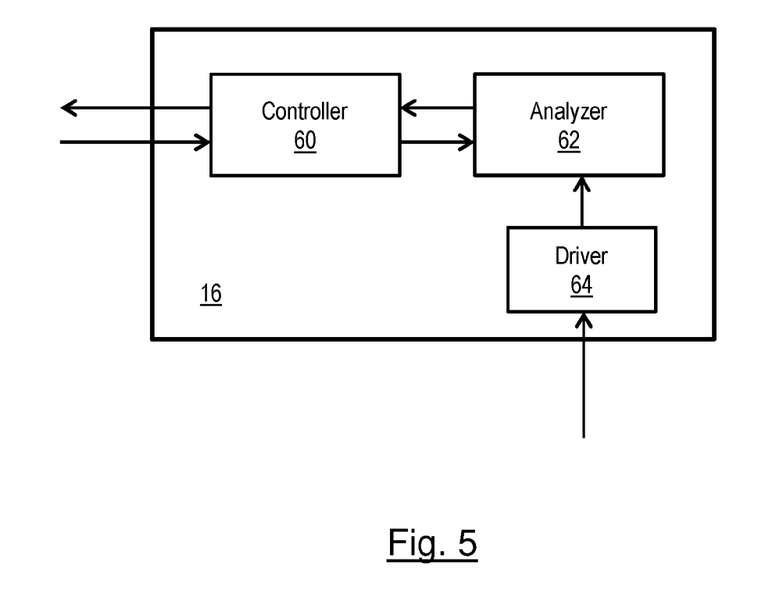
FIG. 5 shows a block diagram of an embodiment of a media player being part of the system of FIG. 1.

FIG. 5 shows a typical embodiment of the media player 16. The illustrated media player 16 has a controller 60, an analyser 62 and a driver 64. Each of these components 60, 62, 64 may be implemented in computer software and/or hardware as is convenient, and may be implemented integrally with or separately from each other as is convenient. Typically, the media player 16 comprises a microprocessor, microcontroller or other processor that is programmed or otherwise configured to implement the controller 60, analyser 62 and driver 64, or otherwise to implement the functionality described herein. It will be understood that the functionality described herein may be implemented in software and/or hardware in many different ways other than the specific configuration shown in FIG. 5.

The controller 60 receives the primary visual information, typically from the control server 20 as described above, and sends it to the display device 12 for display on the screen 14. The controller 60 generates the visual verification information, which in preferred embodiments comprises a sequence of colours, patterns and/or tones, most preferably a sequence of RGB colours. The controller 60 sends the visual verification information to the display device 12 for display on the screen 14 simultaneously with the primary visual information. The controller 60 simultaneously communicates the visual verification information to the analyser 62. In preferred embodiments, the controller 60 communicates to the analyser 62 the part of the visual information that is currently intended to be displayed on the screen 14. Preferably, where the visual information comprises a sequence of parts (each part typically comprising a colour, pattern or tone of the sequence), the controller 60 sends the sequence to the display device 12 one part at a time, and simultaneously communicates the sent part to the analyser 62. As such, at any given time, the analyser 62 is provided with an indication of what visual verification information has been sent to the display device 12 for display at that given time. In preferred embodiments, the analyser 62 is provided with an indication of what colour, pattern or tone is currently intended to be displayed at the verification location 32 of the screen 14.

The driver 64 is a device driver configured to communicate with the optical detector 30. The driver 64 receives the output signal from the optical detector 30, the output signal being indicative of what has been detected by the optical detector 30 at the location 32. In preferred embodiments where the optical detector is a colour sensor, e.g. an RGB sensor, the output signal received by the driver 64 is indicative of a colour code, e.g. an RGB colour code. The driver 64 extracts the colour code, or other relevant visual information, from the detector output signal and communicates the extracted information to the analyser 62.

The analyser 62 compares the visual information received from the driver 64 with the corresponding visual information received from the controller 60 and determines whether or not they match. Advantageously, the comparison is performed in real time, i.e. at any given time the analyser 62 compares the visual information that is intended to be displayed at location 32 at that time with the visual information that has been detected at the location 32 at that time. In preferred embodiments, the comparison involves determining if the colour, pattern or tone that is intended to be displayed at that time matches the colour, pattern or tone that is detected at that time.

In preferred embodiments, the analyser 62 indicates to the controller 60 when it has completed the comparison in response to which the controller 60 sends the next part (e.g. the next colour, pattern or tone) of the verification sequence to the display device 12 and the process described above is repeated for the next part of the sequence and so on until the sequence is completed. The analyser 62 also indicates to the controller 60 whether or not the detected visual information matches the intended visual information. Optionally, the controller 60 may terminate sending a sequence if the analyser 62 indicates that the detected visual information does not match the intended visual information.

The analyser 62 may compare the respective visual information using any suitable conventional data comparison algorithm(s) using one or more measure of similarity. Preferably, the comparison is performed using one or more adjustable similarity threshold. This adjustability allows the media player 16 to be calibrated to suit different display devices 12 and different installation environments. For example, different display devices 12 may render colours differently, and what is detected by the detector 30 may be affected by how it is installed on the screen and on the ambient light. Accordingly, when the analyser 62 compares the visual information received from the driver 64 with the corresponding visual information received from the controller 60, it determines whether or not there is a match by determining if their similarity lies within one or more adjustable similarity threshold.

In preferred embodiments, the analyser 62 compares the visual information received from the driver 64 with the corresponding visual information received from the controller 60 multiple times in succession, the number of times advantageously being adjustable. The analyser 62 is configured to determine whether or not there is a match depending on the outcome of the multiple comparisons. For example, the analyser 62 may determine that there is a match if only one comparison indicates a match, or if a threshold number of comparisons indicate a match, or if a percentage threshold of comparisons indicate a match. This multiple comparison approach allows the media player 16 to accommodate timing differences that may arise as a result of the inherent operation of different display devices 12, the connections between the display device 12 and the medial player 16, the operation of the optical detector 30 and/or the processing speed of the player 16. Such timing differences could otherwise be the cause of the analyser 62 incorrectly determining that there is no match. The adjustability of the number of times the comparison is performed allows the media player 16 to be calibrated to suit a given installation.

In preferred embodiments, the controller 60 is configurable to adjust the position and/or the size of the verification location 32 on the display area 15. This adjustability allows the operation of the media player 16 to be adaptable to suit the positioning of the optical detector 30 with respect to the screen 14, which helps improve the accuracy of the media player's operation.

Adjustable thresholds and parameters may be supported by any conventional means, conveniently via a user interface provided at the media player 16 or the control server 20.

Preferred embodiments of the invention are advantageous in that the optical detector 30 can be easily and unobtrusively mounted on a screen, and is well suited to being installed on different types of display device. Moreover, the preferred method of sending visual verification information to the screen 14 and of detecting the visual verification information is adaptable to accommodate variations in installation set ups, and is relatively robust and simple, which improves accuracy. It will be understood that the various features of the preferred embodiments described herein facilitate one or more of these advantages.

The invention is not limited to the embodiment(s) described herein but can be amended or modified without departing from the scope of the present invention.

What is claimed is:

1. A method of verifying display of primary visual information on a screen of an electronic visual display device, the method comprising:

sending at least one input signal to said electronic visual display device, said at least one input signal comprising data for causing said electronic visual display device to display said primary visual information on said screen, said at least one input signal further including data for causing said electronic visual display device to display visual verification information on said screen simultaneously with said primary visual information;

monitoring said screen using at least one optical detector to detect display of said visual verification information on said screen, wherein said monitoring includes processing an output signal of said at least one optical detector to determine if said output signal includes information representing said visual verification information;

extracting current visual information from said output signal;

comparing in real time the extracted current visual information with the visual verification information intended for current display;

determining if the extracted current visual information matches the intended current visual verification information;

wherein said visual verification information comprises a sequence of multiple parts;

wherein said method further includes sending one part at a time for display on said electronic visual display device; and wherein said comparing in real time comprises comparing the extracted current visual information with the visual verification information intended for current display, and said determining if the extracted current visual information matches the intended current visual verification information is performed after one part is sent and before the next part is sent;

performing, for each part of said visual verification information, multiple instances in succession of said comparing in real time the extracted current visual information with the visual verification information intended for current display and said determining if the extracted current visual information matches the intended current visual verification information; and determining, for each part of said visual verification information, from said multiple instances that the extracted current visual information matches the intended visual verification information if in at least one of said multiple instances there is deemed to be a match, or if in at least a threshold number of said multiple instances there is deemed to be a match, or if in at least a threshold percentage of said multiple instances there is deemed to be a match.

2. The method of claim 1, further including displaying said visual verification information at at least one verification location on a display area of said screen, and monitoring said at least one location using said at least one optical detector, and wherein said at least one verification location may be located at a peripheral part of said display area.

3. The method of claim 1, wherein said at least one input signal comprises data representing said primary visual information, wherein said primary visual information may comprise any one or more of: text; one or more image; one or more animation; one or more video, and wherein said at least one input comprises data representing said visual verification information, said visual verification information comprising any visual information that may be displayed on the screen and be detectable by said at least one optical detector, and wherein, optionally, said data representing said visual verification information is included in, added to, or associated with, data representing said primary visual information.

4. The method of claim 1, further including verifying display of said primary visual information by determining that said visual verification information is detected on said screen by said at least one optical detector.

5. The method of claim 1, wherein said comparing involves using one or more adjustable similarity threshold.

6. The method of claim 1, wherein each part typically comprises data representing a colour, a pattern or a tone.

7. The method of claim 1, wherein said at least one input signal includes data for causing said visual verification information to be displayed on said screen as foreground visual information, optionally overlying a portion of said primary visual information, and/or wherein said at least one input signal includes data for causing said visual verification information to be displayed on said screen separately from said primary visual information.

8. The method of claim 2, further including adjusting the position and/or size of said at least one verification location on said display area of said screen to match the location of said at least one optical detector.

9. The method of claim 5, wherein a number of said multiple instances is adjustable.

* * * * *